United States Patent [19]
Pint

[11] Patent Number: 5,459,522
[45] Date of Patent: Oct. 17, 1995

[54] METHOD FOR ACQUISITION AND DISPLAY OF AN ON-SCREEN PROGRAM GUIDE

[75] Inventor: Charles S. Pint, Evanston, Ill.

[73] Assignee: Zenith Electronics Corporation, Glenview, Ill.

[21] Appl. No.: 258,291

[22] Filed: Jun. 10, 1994

[51] Int. Cl.⁶ .......................... H04N 7/087; H04N 5/445
[52] U.S. Cl. .......................... 348/478; 348/465; 348/467; 348/906
[58] Field of Search .................. 348/6, 906, 563, 348/468, 467, 465, 478, 725; 358/192.1; 345/113, 114, 115, 116, 141; H04N 7/087, 5/445

[56] References Cited

U.S. PATENT DOCUMENTS

| | | | |
|---|---|---|---|
| 5,012,338 | 4/1991 | Davies | 348/467 |
| 5,253,066 | 10/1993 | Vogel | 348/906 |
| 5,343,300 | 8/1994 | Hennig | 348/478 |
| 5,371,548 | 12/1994 | Williams | 348/478 |
| 5,373,324 | 12/1994 | Kuroda et al. | 348/468 |

Primary Examiner—James J. Groody
Assistant Examiner—Jeffrey S. Murrell
Attorney, Agent, or Firm—Roland W. Norris

[57] ABSTRACT

A method for translating the generic, raw information of a broadcast on-screen program guide service into a displayable screen signal that can drive TV electronics, utilizing the step of building a virtual generic screen before creating the displayable screen signal in order to ease the translation burden from generic to TV specific information.

3 Claims, 2 Drawing Sheets

METHOD FOR ACQUISITION AND DISPLAY OF AN ON-SCREEN PROGRAM GUIDE

FIELD OF THE INVENTION

The present invention relates to on-screen program guides of the type whose information is broadcast, i.e., distributed, to a television receiver or display unit (hereinafter TV) and subsequently used to control the functioning of the TV and/or related apparatuses, such as video tape recorders (VTRs).

DISCUSSION OF THE RELATED ART

Recently an interactive on-screen program guide, which is updated by broadcast transmissions and stored in the broadcast receiver, has become a reality. One such on-screen program guide is STARSIGHT (TM). The reader is referred generally to U.S. Pat. No. 4,706,121 for an exposition of such a system. Basically, program guide data can be broadcast during the vertical blanking interval (VBI) of a regular broadcast and stored in a program guide memory within the receiver. The receiver is generally a TV, although it may be a stand alone unit connected to the TV. The viewer can then superimpose the program guide over the regularly displayed programming and select viewing or recording options from the guide. The on-screen programming guide is controlled by a separate microprocessor from that of the TV.

The broadcast program guide data is raw data unrelated to the operation of the TV on which it will be displayed. Thus the program guide data is "universal" or generic and must be formatted or translated into a signal or language which the display circuitry of the TV can display.

This translation of the raw program guide data into a displayable screen signal for the particular circuitry of the TV can require a large amount of programming. Because there are many models of TVs, and because product cycles for an individual model of TV are short, a great many translation programs would have to be accomplished on a continual basis to support a scheme for an on-screen programming guide broadcast to a large enough customer base to make the scheme economically feasible.

There is, therefore, a need to simplify the translation of the generic program guide data into the displayable screens of various TV models. It is among the objects of the present invention to provide a scheme for simplifying such a translation in order to relieve the burden of translation programming necessary to support such a broadcast on-screen program guide scheme.

BRIEF DESCRIPTION OF THE DRAWINGS

Other attendant advantages will be more readily appreciated as the invention becomes better understood by reference to the following detailed description and compared in connection with the accompanying drawings in which like reference numerals designate like parts throughout the figures. It will be appreciated that the drawings may be exaggerated for explanatory purposes.

DESCRIPTION OF THE PREFERRED

Figure 1:
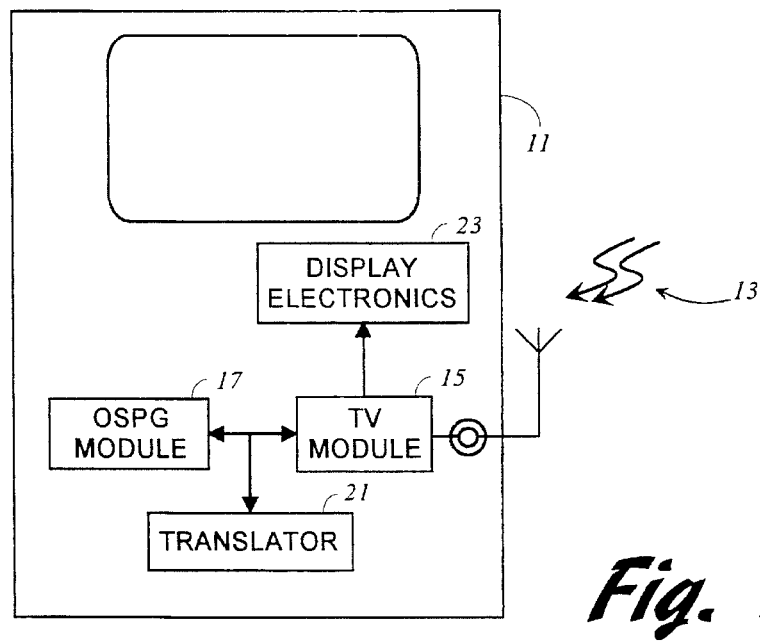
FIG. 1 is a schematic representation on a TV receiver incorporating on-screen program guide electronics according to the present invention.

As seen in FIG. 1, a TV 11 receives a broadcast signal 13 containing on-screen program guide data in the vertical blanking interval (VBI). The signal 13 is routed to the TV control module 15. The TV control module 15 removes the on-screen program guide data from the broadcast signal 13 and transfers this data to the on-screen program guide module 17. While indicated as being within the TV 11, the on-screen program guide module may also be a stand alone unit. The on-screen program guide module 17 then must organize the data in a manner suitable for interaction with the TV module 15 and display electronics 23 as further explained below.

As the data is in generic, or raw, form it must be translated into a form, or language, that the specific model of TV will "understand", i.e., the type of signal the TV display electronics 23 can use to produce a display of the on-screen program guide. This is the function of the translator block 21. Were the translator block 21 to convert the on-screen program guide raw data directly into displayable screen data with all instructions necessary to operate the display electronics 23 of the TV 11 a translation program of 15K–20K bytes of complex code would be required and would have to be rewritten everytime a new TV control module 15 was introduced. As further explained below, by following the method of the present invention, only about 1K byte of translation code is necessary and would have to be rewritten upon introduction of a new TV control module 15. It will be appreciated that the translator block 21 may be physically incorporated into either the on-screen program guide module 17 or the TV control module 15 as dictated by necessity or convenience and as indicated by its location between the modules 15 and 17.

Figure 2:
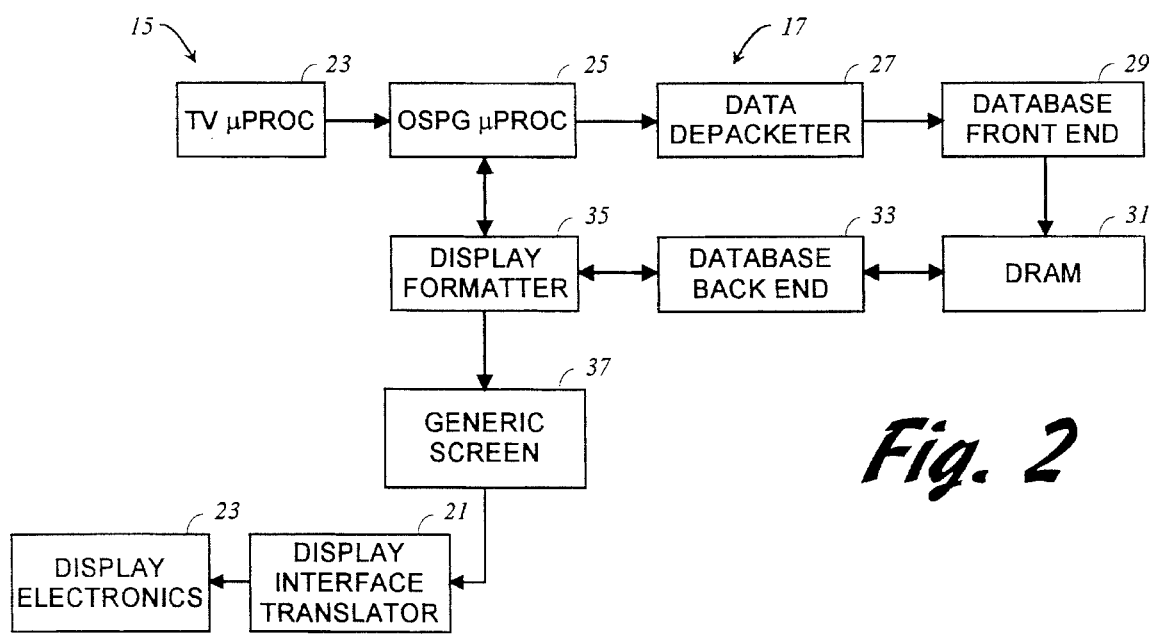
FIG. 2 is a block diagram of the on-screen program guide electronics.

Referring to FIGS. 1 and 2, the broadcast signal 13 is originally distributed to the TV microprocessor 23 within the TV control module 15. The TV microprocessor 23 strips the on-screen program guide data from the VBI and transfers this data to the on-screen program guide microprocessor 25 where it is packetized into a specific length of data for further processing in the on-screen program guide module 17. A data depacketer 27 then breaks down the packetized data into "commands", i.e., program guide data with associated instructions and identifiers, of variable length. The database front end 29 then takes the commands and stores only the necessary program guide data in an orderly fashion into DRAM, or other suitable memory 31. The data base back end 33 performs the retrieval from the memory 31 of program guide data which is requested by the display formatter 35. The display formatter 35 then formats the raw program guide data into a generic screen 37 consisting of "primitives", i.e., descriptors of shapes, their colors and borders, alphanumerics and icons contained therein, etc. without putting these descriptors into a language which the display electronics 23 can understand. The display interface translator 21 can then translate the generic screen 37 into a language which will drive the display electronics when the program guide is called on to be displayed.

Figure 3:
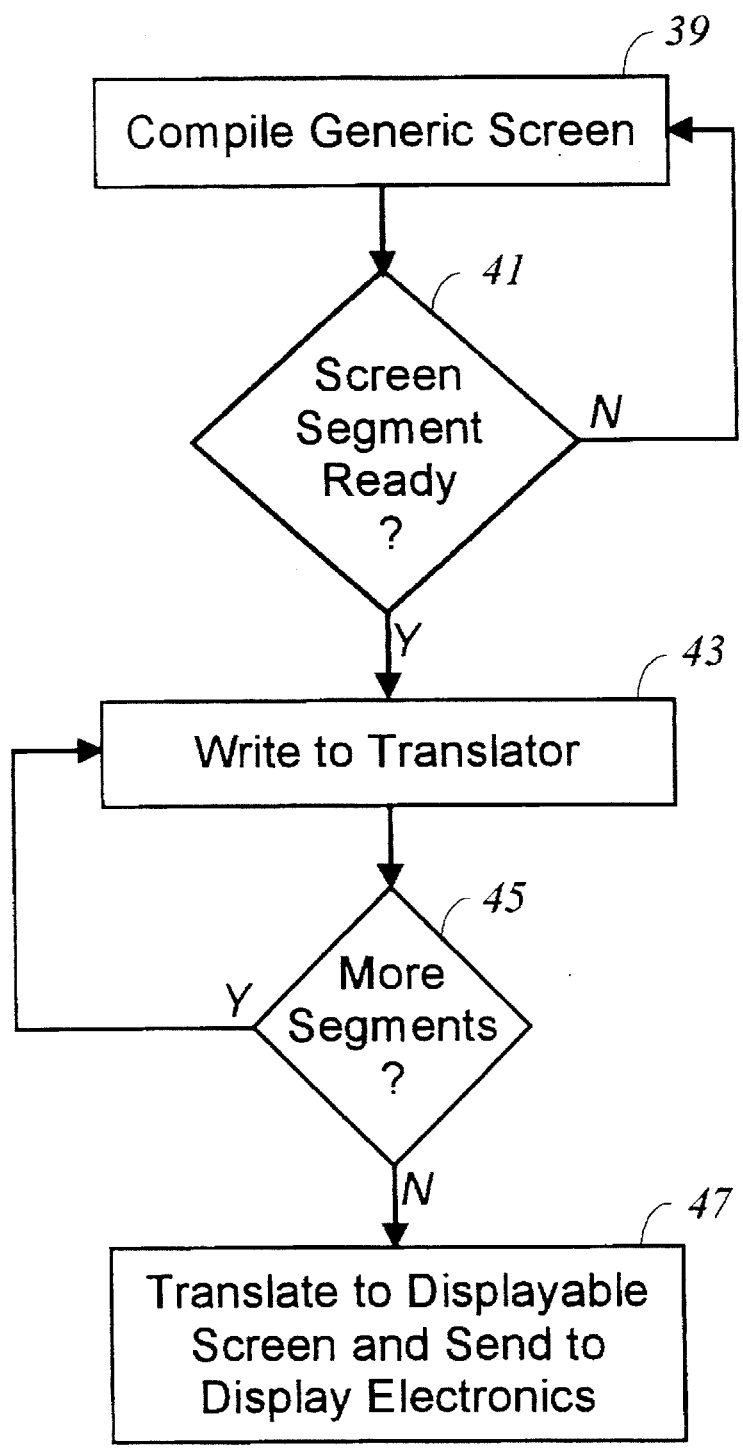
FIG. 3 is a flow chart of the operation to enable the display of the on-screen program guide.

As illustrated by the flow chart of FIG. 3, when the operator of the TV selects the program guide function, the TV microprocessor will command 39 the on-screen program guide microprocessor to issue instructions to the display formatter to compile a generic screen. The TV microprocessor will then poll 41 the on-screen program guide microprocessor to determine if any generic screen primitives, or segments thereof, are compiled. If yes, these generic screen descriptors are written 43 to the translator. The on-screen program guide microprocessor is repeatedly polled 45 until there are no more segments to write to the translator. At that time the generic screen is translated 47 by the translator to a language the display electronics can understand, i.e., the generic screen is converted into a displayable screen, although both screens are virtual. The displayable screen is then sent to the display electronics to produce the displayed on-screen program guide, which the TV operator can use to review and select programming for display or recording.

While the present invention has been illustrated and described in connection with the preferred embodiments, it is not to be limited to the particular structure shown, because many variations thereof will be evident to one skilled in the art and are intended to be encompassed in the present invention as set forth in the following claims:

Having thus described the invention,
What is claimed is:

1. A method for acquisition and display of an on-screen program guide on a television comprising:
   A) receiving broadcast raw data of an on-screen program guide;
   B) processing the raw data to obtain data necessary to create a generic program guide screen;
   C) storing the data necessary to create the generic screen in memory;
   D) constructing a generic virtual screen of a program guide from the necessary data;
   E) translating the generic screen to a displayable screen; and
   F) displaying the screen on a TV.

2. A method for acquisition and display of an on-screen program guide on a television comprising:
   A) receiving broadcast raw data of an on-screen program guide in the vertical blanking interval of a broadcast signal;
   B) removing the raw data from the vertical blanking interval of the broadcast signal;
   C) processing the raw data to obtain fragments necessary for the display of the on-screen program guide;
   D) storing the raw data fragments in a program guide memory;
   E) assembling the raw fragments into generic virtual screen blocks;
   F) assembling the generic virtual screen blocks into a generic virtual whole screen;
   G) storing the generic virtual whole screen in the program guide memory;
   H) translating the generic virtual whole screen into a displayable screen format understandable by the television display electronics; and
   I) displaying the displayable program guide on the television.

3. The method according to claim 2 further comprising: polling the program guide memory with a controller of the television to determine if there is generic virtual screen information ready for translation.

\* \* \* \* \*

(12) EX PARTE REEXAMINATION CERTIFICATE (8205th)
United States Patent
Pint

(10) Number: US 5,459,522 C1
(45) Certificate Issued: May 10, 2011

(54) METHOD FOR ACQUISITION AND DISPLAY OF AN ON-SCREEN PROGRAM GUIDE

(75) Inventor: Charles S. Pint, Evanston, IL (US)

(73) Assignee: LG Electronics Inc., Seoul (KR)

Reexamination Request:
No. 90/009,577, Oct. 30, 2009

Reexamination Certificate for:
Patent No.: 5,459,522
Issued: Oct. 17, 1995
Appl. No.: 08/258,291
Filed: Jun. 10, 1994

(51) Int. Cl.
*H04N 7/088* (2006.01)
*H04N 7/087* (2006.01)
*H04N 5/445* (2006.01)

(52) U.S. Cl. .................. 348/478; 348/465; 348/467; 348/E5.105; 348/E7.036; 725/39

(58) Field of Classification Search .................. None
See application file for complete search history.

(56) References Cited

U.S. PATENT DOCUMENTS

| | | |
|---|---|---|
| 3,497,760 A | 2/1970 | Kiesling |
| 3,816,726 A | 6/1974 | Sutherland et al. |
| 3,899,662 A | 8/1975 | Kreeger et al. |
| 3,916,387 A | 10/1975 | Woodrum |
| 3,927,250 A | 12/1975 | Rainger |
| 3,982,065 A | 9/1976 | Barnaby et al. |
| 4,010,451 A | 3/1977 | Kibble et al. |
| 4,016,361 A | 4/1977 | Pandey |
| 4,052,710 A | 10/1977 | Calhoun et al. |
| 4,064,490 A | 12/1977 | Nagel |
| 4,135,213 A | 1/1979 | Wintfeld et al. |
| 4,149,240 A | 4/1979 | Misunas et al. |
| 4,233,628 A | 11/1980 | Ciciora |
| 4,236,206 A | 11/1980 | Strecker et al. |
| 4,240,139 A | 12/1980 | Fukuda et al. |
| 4,290,062 A | 9/1981 | Marti et al. |
| 4,303,986 A | 12/1981 | Lans |
| 4,315,310 A | 2/1982 | Bayliss et al. |
| 4,318,184 A | 3/1982 | Millett et al. |
| 4,373,182 A | 2/1983 | Schultz et al. |

(Continued)

FOREIGN PATENT DOCUMENTS

| | | |
|---|---|---|
| GB | 2192770 A | 1/1988 |
| JP | 57176892 U | 10/1982 |
| JP | 58196738 A | 11/1983 |
| JP | 58210776 A | 12/1983 |
| JP | 61222390 A | 10/1986 |
| JP | 63240188 A | 10/1988 |
| JP | 2298182 A | 12/1990 |
| JP | 3123186 A | 5/1991 |
| JP | 4095480 A | 3/1992 |
| JP | 4200082 A | 7/1992 |
| JP | 04355583 B2 | 12/1992 |
| JP | 5083688 A | 4/1993 |
| JP | 5095534 A | 4/1993 |
| JP | 5236437 A | 9/1993 |
| JP | 05284479 A | * 10/1993 |
| JP | 5284479 A | 10/1993 |
| JP | 5284481 A | 10/1993 |
| WO | WO90/15507 A1 | 12/1990 |
| WO | WO92/03018 A1 | 2/1992 |
| WO | WO94/13107 A1 | 6/1994 |

OTHER PUBLICATIONS

Antonoff, M., "Stay Tuned for a Smart TV," Popular Science, pp. 62–65, Nov. 1990.

(Continued)

*Primary Examiner*—Christina Y Leung

(57) ABSTRACT

A method for translating the generic, raw information of a broadcast on-screen program guide service into a displayable screen signal that can drive TV electronics, utilizing the step of building a virtual generic screen before creating the displayable screen signal in order to ease the translation burden from generic to TV specific information.

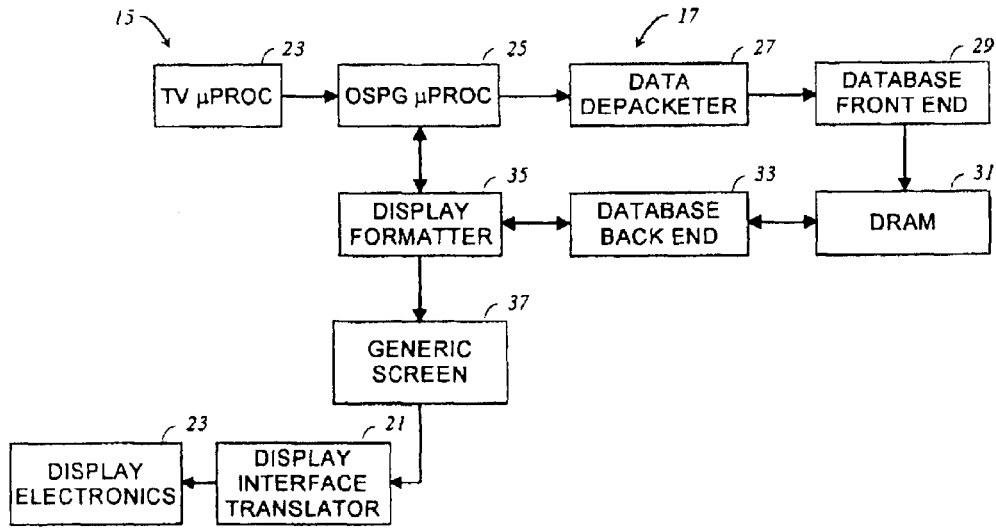

U.S. PATENT DOCUMENTS

| | | | |
|---|---|---|---|
| RE31,200 E | 4/1983 | Sukonick et al. |
| 4,388,645 A | 6/1983 | Cox et al. |
| 4,390,901 A | 6/1983 | Keiser |
| 4,395,758 A | 7/1983 | Helenius et al. |
| 4,413,315 A | 11/1983 | Kurakake |
| 4,428,065 A | 1/1984 | Duvall et al. |
| 4,432,053 A | 2/1984 | Gaither et al. |
| 4,466,060 A | 8/1984 | Riddle |
| 4,471,463 A | 9/1984 | Mayer et al. |
| 4,488,179 A | 12/1984 | Kruger et al. |
| 4,491,836 A | 1/1985 | Collmeyer et al. |
| 4,509,115 A | 4/1985 | Manton et al. |
| 4,541,045 A | 9/1985 | Kromer |
| 4,542,376 A | 9/1985 | Bass et al. |
| 4,550,315 A | 10/1985 | Bass et al. |
| 4,555,700 A | 11/1985 | Convis et al. |
| 4,555,775 A | 11/1985 | Pike |
| 4,590,585 A | 5/1986 | Cummings et al. |
| 4,591,845 A | 5/1986 | Komatsu et al. |
| 4,602,346 A | 7/1986 | Kawakami et al. |
| 4,613,852 A | 9/1986 | Maruko |
| 4,613,946 A | 9/1986 | Forman |
| 4,618,859 A | 10/1986 | Ikeda |
| 4,631,090 A | 12/1986 | Naumann et al. |
| 4,631,690 A | 12/1986 | Corthout et al. |
| 4,635,121 A | 1/1987 | Hoffman et al. |
| 4,642,790 A | 2/1987 | Minshull et al. |
| 4,653,020 A | 3/1987 | Cheselka et al. |
| 4,672,680 A | 6/1987 | Middleton |
| 4,677,550 A | 6/1987 | Ferguson |
| 4,688,032 A | 8/1987 | Saito et al. |
| 4,694,404 A | 9/1987 | Meagher |
| 4,700,181 A | 10/1987 | Maine et al. |
| 4,700,320 A | 10/1987 | Kapur |
| 4,704,697 A | 11/1987 | Kiremidjian et al. |
| 4,706,121 A | 11/1987 | Young |
| 4,710,761 A | 12/1987 | Kapur et al. |
| 4,710,763 A | 12/1987 | Franke et al. |
| 4,731,606 A | 3/1988 | Bantz et al. |
| 4,736,309 A | 4/1988 | Johnson et al. |
| 4,737,916 A | 4/1988 | Ogawa et al. |
| 4,737,921 A | 4/1988 | Goldwasser et al. |
| 4,742,451 A | 5/1988 | Bruckert et al. |
| 4,751,578 A | 6/1988 | Reiter et al. |
| 4,757,470 A | 7/1988 | Bruce et al. |
| 4,760,390 A | 7/1988 | Maine et al. |
| 4,761,642 A | 8/1988 | Huntzinger |
| 4,764,867 A | 8/1988 | Hess |
| 4,787,063 A | 11/1988 | Muguet |
| 4,803,477 A | 2/1989 | Miyatake et al. |
| 4,805,134 A | 2/1989 | Calo et al. |
| 4,807,142 A | 2/1989 | Agarwal |
| 4,809,170 A | 2/1989 | Leblang et al. |
| 4,811,240 A | 3/1989 | Ballou et al. |
| 4,813,013 A | 3/1989 | Dunn |
| 4,829,569 A | 5/1989 | Seth-Smith et al. |
| 4,868,766 A | 9/1989 | Oosterholt |
| 4,870,561 A | 9/1989 | Love et al. |
| 4,885,775 A | 12/1989 | Lucas |
| 4,897,636 A | 1/1990 | Nishi et al. |
| 4,904,994 A | 2/1990 | Sasser et al. |
| 4,908,707 A | 3/1990 | Kinghorn |
| 4,908,713 A | 3/1990 | Levine |
| 4,928,247 A | 5/1990 | Doyle et al. |
| 4,935,730 A | 6/1990 | Kosuka |
| 4,939,671 A | 7/1990 | Sasser |
| 4,947,257 A | 8/1990 | Fernandez et al. |
| 4,949,180 A | 8/1990 | Miles |
| 4,965,752 A | 10/1990 | Keith |
| 4,977,455 A | 12/1990 | Young |
| 4,984,183 A | 1/1991 | Ohuchi |
| 5,012,338 A | 4/1991 | Davies |
| 5,038,211 A | 8/1991 | Hallenbeck |
| 5,060,170 A | 10/1991 | Bourgeois et al. |
| 5,073,933 A | 12/1991 | Rosenthal |
| 5,079,545 A | 1/1992 | Priem et al. |
| 5,097,411 A | 3/1992 | Doyle et al. |
| 5,129,013 A | 7/1992 | Holzmann et al. |
| 5,161,019 A | 11/1992 | Emanuel |
| 5,182,797 A | 1/1993 | Liang et al. |
| 5,223,924 A | 6/1993 | Strubbe |
| 5,231,493 A | 7/1993 | Apitz |
| 5,249,265 A | 9/1993 | Liang |
| 5,251,322 A | 10/1993 | Doyle et al. |
| 5,253,066 A * | 10/1993 | Vogel ......................... 725/28 |
| 5,278,954 A | 1/1994 | Hohlfeld et al. |
| 5,287,439 A | 2/1994 | Koga et al. |
| 5,289,577 A | 2/1994 | Gonzales et al. |
| 5,293,357 A | 3/1994 | Hallenbeck |
| 5,301,028 A | 4/1994 | Banker et al. |
| 5,307,173 A | 4/1994 | Yuen et al. |
| 5,317,676 A | 5/1994 | Austvold et al. |
| 5,329,615 A | 7/1994 | Peaslee et al. |
| 5,343,300 A | 8/1994 | Hennig |
| 5,347,634 A | 9/1994 | Herrell et al. |
| 5,371,548 A | 12/1994 | Williams |
| 5,371,849 A | 12/1994 | Peaslee et al. |
| 5,373,324 A | 12/1994 | Kuroda et al. |
| 5,408,600 A | 4/1995 | Garfinkel et al. |
| 5,428,554 A | 6/1995 | Laskoski |
| 5,430,841 A | 7/1995 | Tannenbaum et al. |
| 5,440,746 A | 8/1995 | Lentz |
| 5,444,842 A | 8/1995 | Bentson et al. |
| 5,444,853 A | 8/1995 | Lentz |
| 5,450,599 A | 9/1995 | Horvath et al. |
| 5,455,958 A | 10/1995 | Flurry et al. |
| 5,459,482 A | 10/1995 | Orlen |
| 5,465,351 A | 11/1995 | Lemmo |
| 5,473,609 A | 12/1995 | Chaney |
| 5,477,262 A | 12/1995 | Banker et al. |
| 5,479,266 A | 12/1995 | Young et al. |
| 5,479,268 A | 12/1995 | Young et al. |
| 5,490,246 A | 2/1996 | Brotsky et al. |
| 5,500,933 A | 3/1996 | Schnorf |
| 5,502,504 A | 3/1996 | Marshall et al. |
| 5,515,106 A | 5/1996 | Chaney et al. |
| 5,517,601 A | 5/1996 | Rust et al. |
| 5,528,735 A | 6/1996 | Strasnick et al. |
| 5,532,754 A | 7/1996 | Young et al. |
| 5,537,612 A | 7/1996 | Cherrick et al. |
| 5,541,738 A | 7/1996 | Mankovitz |
| 5,546,530 A | 8/1996 | Grimaud et al. |
| 5,548,703 A | 8/1996 | Berry et al. |
| 5,552,833 A | 9/1996 | Henmi et al. |
| 5,555,354 A | 9/1996 | Strasnick et al. |
| 5,557,794 A | 9/1996 | Matsunaga et al. |
| 5,559,548 A | 9/1996 | Davis et al. |
| 5,559,549 A | 9/1996 | Hendricks et al. |
| 5,572,651 A | 11/1996 | Weber et al. |
| 5,579,055 A | 11/1996 | Hamilton et al. |
| 5,592,678 A | 1/1997 | Cook et al. |
| 5,603,034 A | 2/1997 | Swanson |
| 5,635,978 A | 6/1997 | Alten et al. |
| 5,644,354 A | 7/1997 | Thompson et al. |
| 5,649,230 A | 7/1997 | Lentz |
| 5,671,381 A | 9/1997 | Strasnick et al. |
| 5,731,844 A | 3/1998 | Rauch et al. |
| 5,732,338 A | 3/1998 | Schwob |
| 5,761,401 A | 6/1998 | Kobayashi et al. |
| 5,768,552 A | 6/1998 | Jacoby |
| 5,819,077 A | 10/1998 | Koga et al. |

| 5,856,830 | A | 1/1999 | Yamamoto |
| 5,861,885 | A | 1/1999 | Strasnick et al. |
| 5,915,068 | A | 6/1999 | Levine |
| 5,990,927 | A | 11/1999 | Hendricks et al. |
| 6,154,875 | A | 11/2000 | Tanaka et al. |
| 6,160,560 | A | 12/2000 | Keller et al. |
| 6,172,683 | B1 | 1/2001 | Bloomfield |
| 6,266,149 | B1 | 7/2001 | Zandee |

OTHER PUBLICATIONS

Bensch, U., "Video Text Programs VideoRecorder (VPV), IEEE 1998 International Conference on Consumer Electronics," pp. 210–211, Jun. 8, 1988.

Brown et al., "Telidon Technology Development in Canada," pp. 547–548, 1980.

Chamber, J.P., "A Domestic Television Programme Delivery Service Based on Teletext," International Broadcasting Convention, pp. 256–260, Sep. 21–25, 1990.

Chao, T.H. et al., Development of Video Systems in Taiwan, 1994, International Symposium on Speech, Image Processing and Neural Networks, pp. 355–360, Apr. 13, 1994.

Cherrick, S. et al., "An Individual Adressable TV Receiver with Interactive Channel Guide Display, VCR, and Cable Box Control," IEEE Transactions on Consumer Electronics, vol. 40, No. 3, pp. 317–328, Aug. 1994.

Domina, F.T., "The Information Gateway System: A Means for Acquisition, Normalization, and Redistribution of On–Screen Information," 1993 NCTA Technical Papers, pp. 201–210, Jun. 6–9, 1993.

Hallenbeck, P.D., "Personal Home TV Programming Fuide, IEEE 1990 International Conference on Consumer Electronics," pp. 310–311, Jun. 6, 1990.

Hedger, "Telesoftware—Value Added Teletext," Aug. 1980.

Karpinski, R., "Building a Better Box," pp. 24–28, Nov. 22, 1993.

McKenzie, "Oracle—An Information Broadcasting Service Using Data Transmission in the Vertical Interval," SMPTE Journal, vol. 83, Jan. 1974.

Roizen, "Teletext in the USA," pp. 602–608, Jul. 1981.

Veith, Television's Teletext, pp. 22–25, 1983.

Zeisel, G. et al., An Interactive Menu–Driven Remote Control Unit for TV–Receivers and VC–Recorders, IEEE Transactions on Consumer Electronics, vol. 34, Issue 3, pp. 814–818, Aug. 1988.

Hutheesing, N., "Interactivity for the Passive," Forbes, pp. 244–245, Dec. 6, 1993.

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-3 is confirmed.

* * * * *